Aug. 10, 1948.  A. L. JOHNSON  2,446,833
APPARATUS FOR PRODUCING CONTROLLED RELATIVE
MOTION BETWEEN TOOLS AND WORKPIECES
Filed July 14, 1945  4 Sheets-Sheet 1
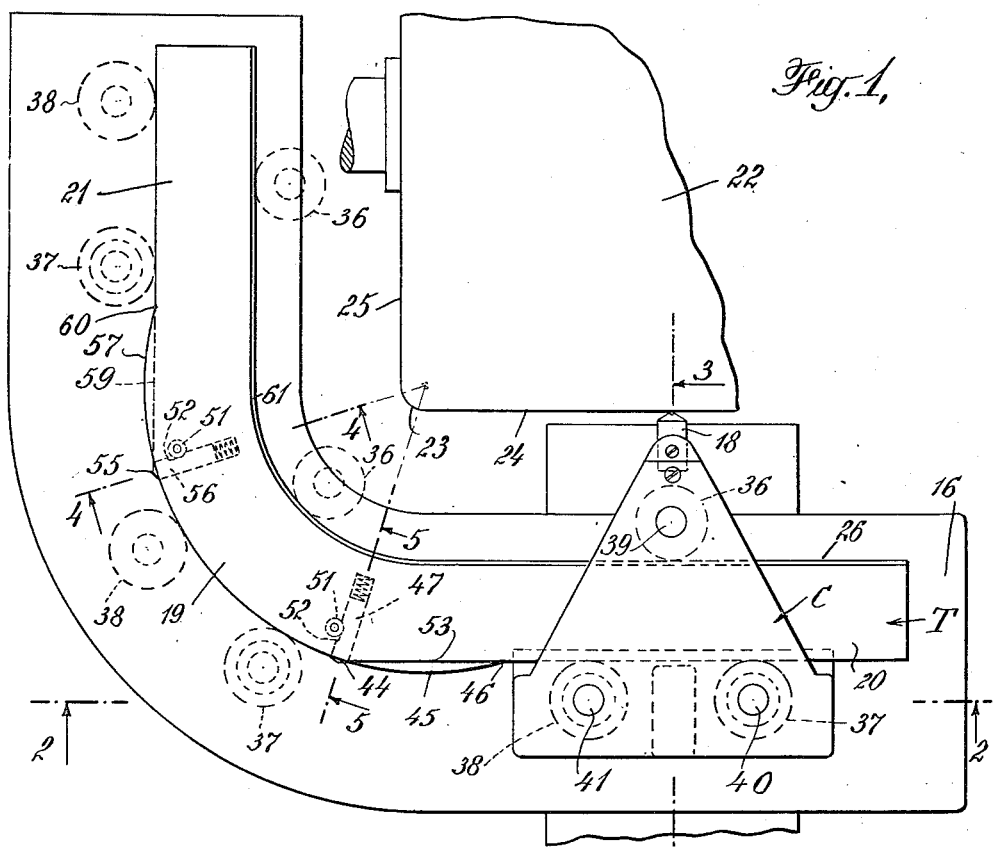
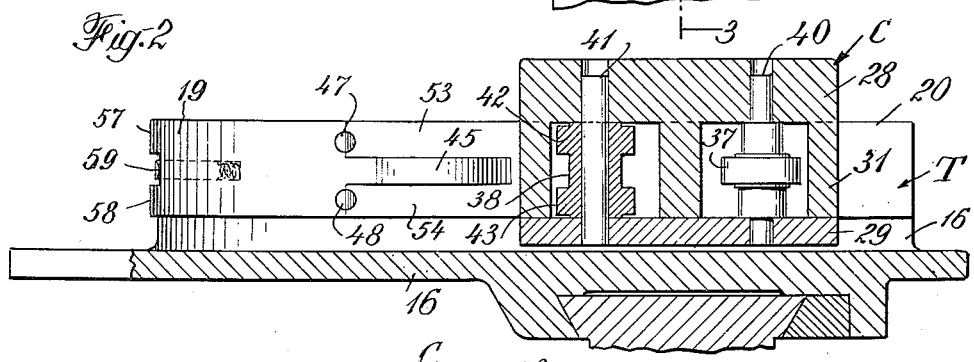
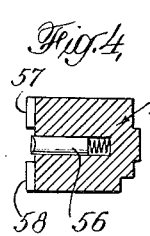
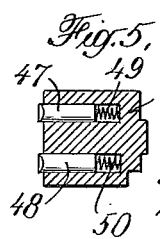
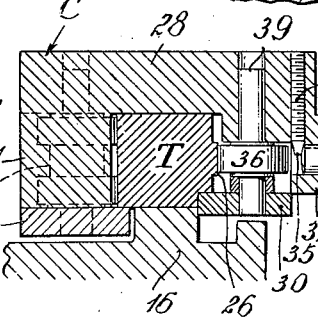
INVENTOR
Arden Lee Johnson
BY
Pennie, Davis, Marvin & Edmonds
HIS ATTORNEYS Aug. 10, 1948.                A. L. JOHNSON                    2,446,833
            APPARATUS FOR PRODUCING CONTROLLED RELATIVE
                   MOTION BETWEEN TOOLS AND WORKPIECES
Filed July 14, 1945                                        4 Sheets-Sheet 2
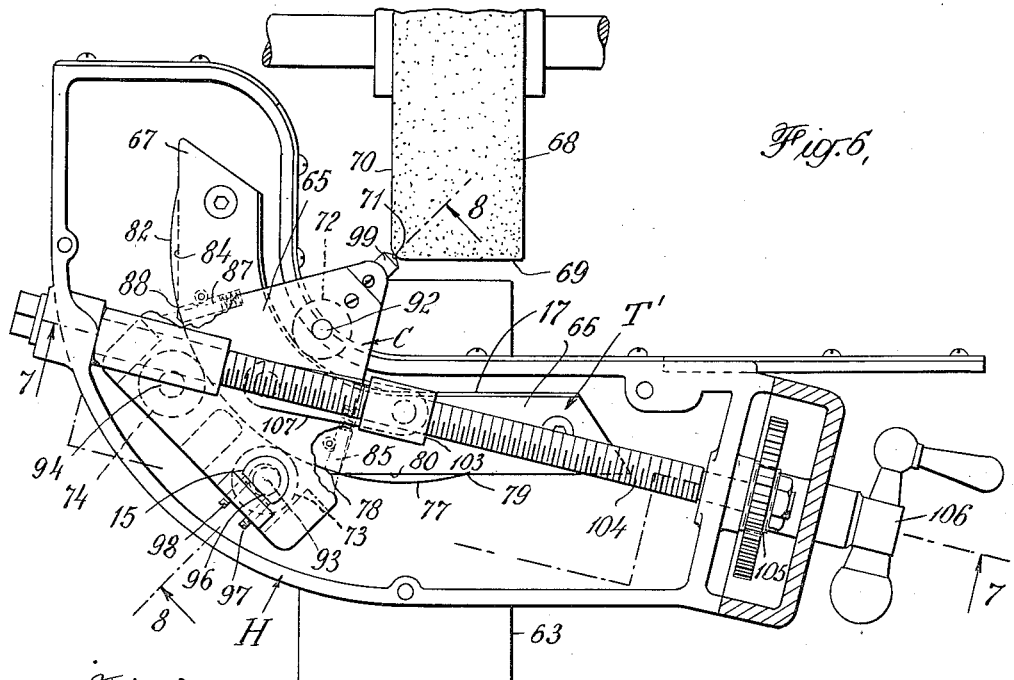
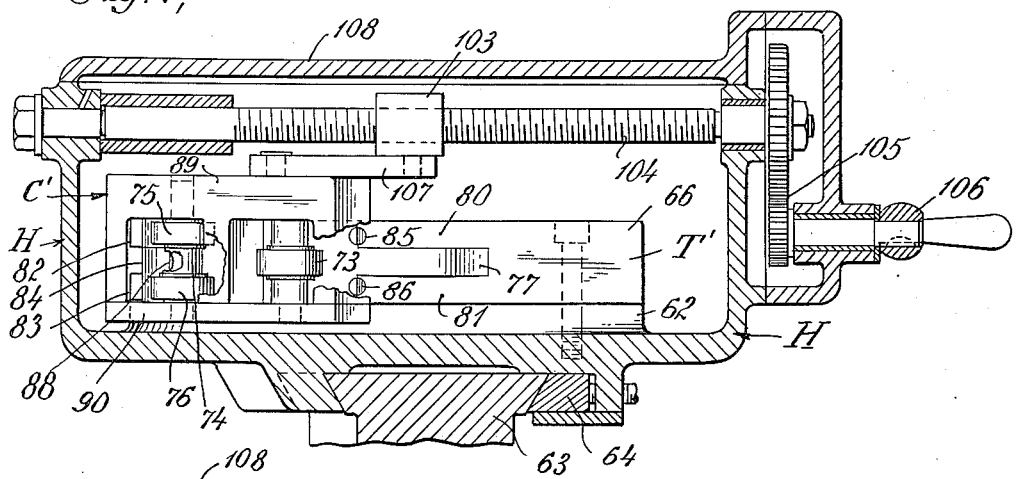
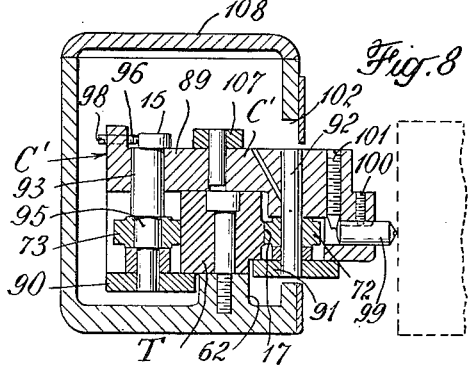
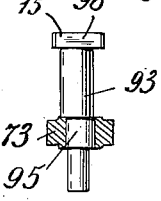
INVENTOR
Arden Lee Johnson
BY
Pennie, Davis, Marvin & Edmonds
HIS ATTORNEYS

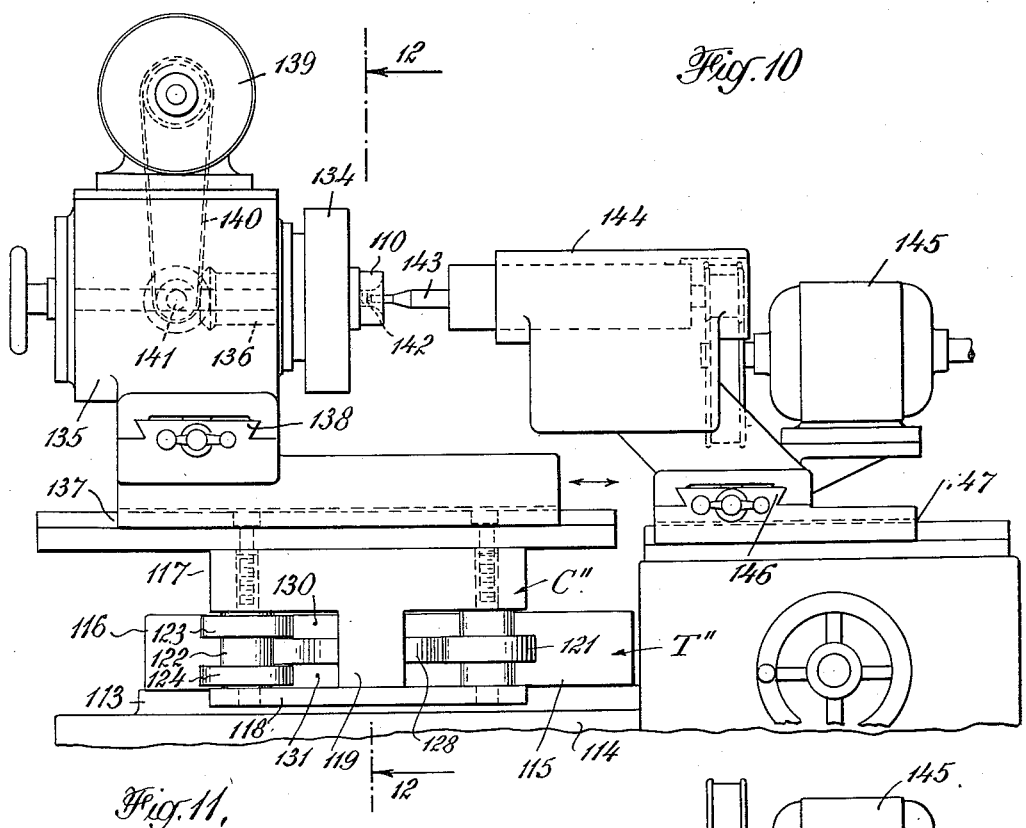
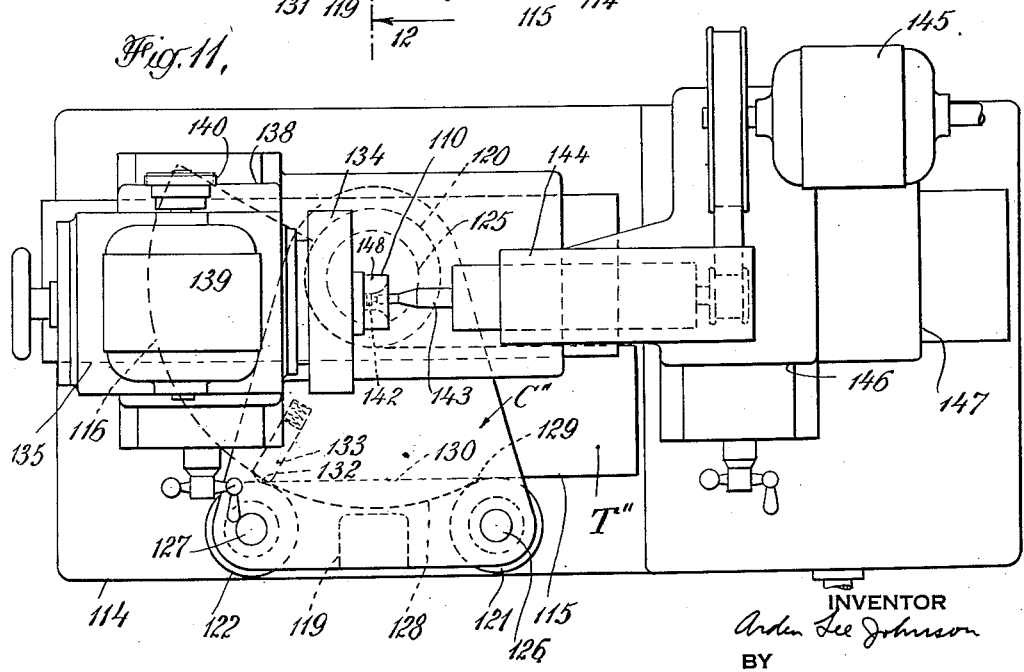

Aug. 10, 1948.                    A. L. JOHNSON                        2,446,833
              APPARATUS FOR PRODUCING CONTROLLED RELATIVE
                      MOTION BETWEEN TOOLS AND WORKPIECES
Filed July 14, 1945                                        4 Sheets-Sheet 4
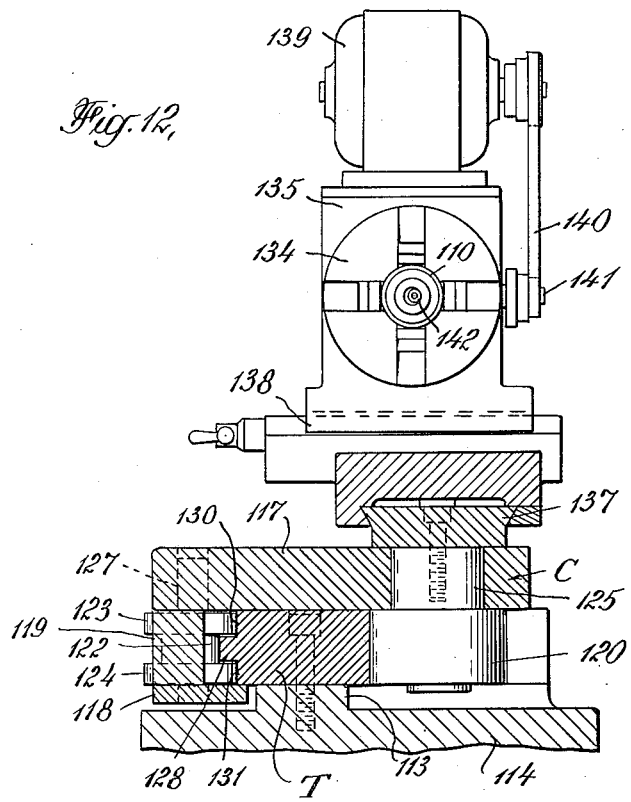
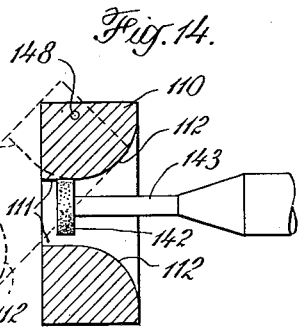
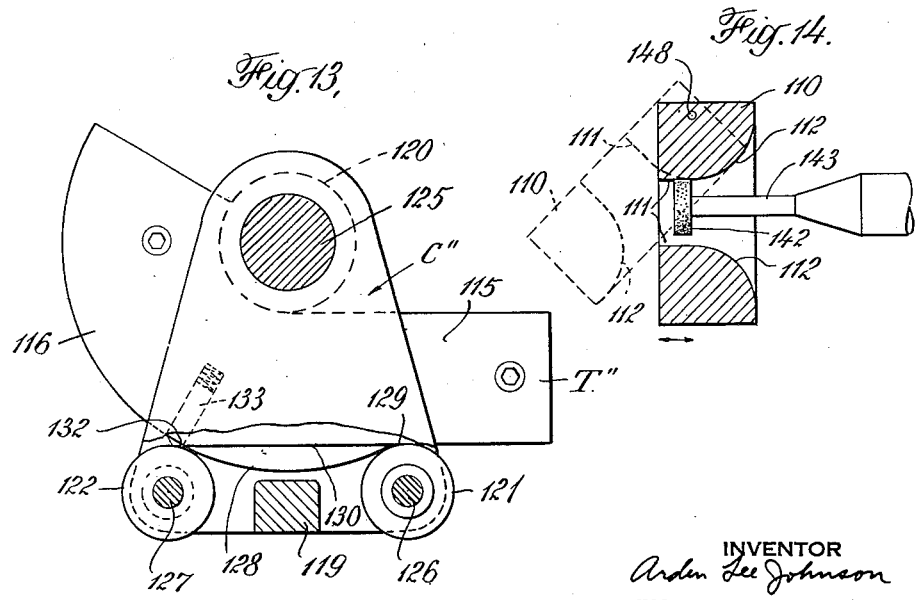
INVENTOR
Arden Lee Johnson
BY
Pennie, Davis, Marvin & Edmonds
HIS ATTORNEYS Patented Aug. 10, 1948

2,446,833

UNITED STATES PATENT OFFICE 2,446,833

APPARATUS FOR PRODUCING CONTROLLED RELATIVE MOTION BETWEEN TOOLS AND WORKPIECES

Arden Lee Johnson, Detroit, Mich., assignor to Vinco Corporation, Detroit, Mich., a corporation of Michigan Application July 14, 1945, Serial No. 605,150

10 Claims. (Cl. 125—11)

This invention relates to a finishing device and more particularly concerns apparatus for effecting uninterrupted relative movement between a grinding, dressing, or other cutting or finishing tool and a dressing wheel or other part, the profile of which includes a curved portion with at least one straight portion tangent thereto.

Various machine and machine tool parts have surfaces or profiles including a radially curved or arcuate portion and a plane or straight portion or portions tangent thereto. In some instances, it is desirable or necessary that such composite surfaces or profiles be finished to a high degree of accuracy, and where the highest accuracy is to be obtained, the relative movement between the finishing or dressing tool and the parts to be finished must be continuous and uninterrupted along the entire composite profile. For example, when an abrasive grinding wheel is to be dressed to a profile of the type described, the wheel is rotated and a dressing tool such as a diamond point is moved along a straight path in contact with a flat surface of the profile to dress a so-called "angle." At the point where the flat surface is to merge into and become tangent to an arcuate curved surface or so-called "radius," the straight line movement of the tool is stopped and the tool is turned about a pivot to dress the arcuate surface. The stopping of the tool at this point of tangency, which has been necessitated by the construction of previously known devices of this type, forms a very minute groove or inaccuracy in the surface being dressed, probably because abrasive particles from the wheel are caught between the tool and the wheel surface while the tool is stationary. It is accordingly desirable to provide means for moving the tool relative to the wheel continuously at a substantially uniform rate and without any interruption as the tool traverses the entire composite wheel profile to be dressed.

Other operations in which uninterrupted relative movement between a tool and a part is desired include the grinding or finishing of various parts having surfaces of rotation including curved portions with tangent straight portions. Such surfaces are formed for example in certain types of fluid orifices or nozzles.

With the above and other considerations in mind, it is proposed in accordance with the present invention to provide improved apparatus for causing uninterrupted relative movement between a tool and a part to be shaped or finished along a path including an arcuate curved portion and at least one straight portion tangent thereto. Mechanism embodying the invention may be arranged either to move the tool along such a path relative to the part or work being finished, or to move the work along such a path relative to the tool. Other objects of the invention include the provision of a device of the type described which is simple in construction, which may be maintained accurate despite wear in use and which can be operated to accurately finish parts by relatively unskilled attendants.

To enable others skilled in the art to so fully apprehend the novel features of my invention that they may embody the same in various useful devices, I have illustrated certain typical applications thereof in the annexed drawings, in which:

Fig. 1 is a diagrammatic and simplified plan view of mechanism embodying the invention and arranged to dress contiguous straight and arcuate portions of the profile of a grinding wheel;

Figs. 2 to 5 inclusive are respectively sectional views taken along the lines 2—2, 3—3, 4—4, and 5—5 of Fig. 1 and viewed in the direction of the arrows;

Fig. 6 is a plan view, similar to Fig. 1, showing a practical construction of the wheel dresser embodying the present invention;

Figs. 7 and 8 are respectively sectional views taken along the lines 7—7 and 8—8 of Fig. 6 and viewed in the direction of the arrows;

Fig. 9 is an elevation of an adjustable roller employed in the embodiment of Fig. 6;

Fig. 10 is an elevation showing another form of mechanism embodying the invention in which the part being finished rather than the finishing tool is moved continuously in the composite straight and arcuate path;

Fig. 11 is a plan view of the apparatus shown in Fig. 10;

Fig. 12 is a sectional view taken along the line 12—12 of Fig. 10 and viewed in the direction of the arrows;

Fig. 13 is a simplified plan view, partly in section, showing the track and carriage means of the modification of Fig. 10; and Fig. 14 is an enlarged plan view, partly in section, illustrating the relative movement between the part being finished and the finishing tool in the modification of Fig. 10.

Referring to the drawings, and particularly to Figs. 1 to 5 inclusive, the embodiment of my invention there illustrated includes a track T carried on a suitable support 16 and a carriage C mounted to move along the track and carrying a dressing tool in the form of a diamond point 18.

The track T has a curved or arcuate portion 19 connecting two contiguous straight portions 20 and 21, and the particular track illustrated is designed to move the diamond point 18 along a profile such as that of the rotating grinding wheel 22 which includes an arcuate portion or "radius" 23 connecting two straight portions or "angles" 24 or 25 which lie tangent to the arcuate portion.

The inner face of the track T is provided with a continuous central bearing surface 26 which is accurately finished to a configuration corresponding to that of the profile to be dressed. The carriage C includes an upper plate 28 resting on the plane upper surface of the track T, a lower plate 29 which extends under the outer edge of the overhanging outer surface of the track T as shown in Fig. 3, and a lower inner plate 30 which similarly extends under an inner overhanging portion of the track. The plate 29 may be secured to the plate 28 by suitable posts 31, and the plate 30 may be similarly secured to the plate 28. The diamond point 18 is held in an opening in an extension 32 of the plate 28 by means of a set screw 33, and the point may be adjusted toward and from the work by an adjusting screw 34 having a tapered end 35. It will be understood that the mounting of the diamond point 18 is such that its axis is normal to the inner bearing surface 26 of the track T on which the carriage C rides.

The carriage C is guided along the track T by three rollers, a single roller 36 engaging the inner bearing surface 26 of the track, and two rollers 37 and 38 engaging the outer track surface. The rollers 36, 37 and 38 are respectively carried on suitable trunnions 39, 40 and 41 journaled in the carriage plates 28, 30 and 29 as shown in Figs. 2 and 3. The relative disposition of these rollers 36, 37 and 38 is such that their axes form an isosceles triangle with the line between the outer rollers 37 and 38 forming the base thereof, as will be apparent from Fig. 1. The two outer rollers 37 and 38 are arranged to respectively engage portions of the outer track surface that are relatively displaced, and in the disclosed embodiment, this is accomplished by disposing the bearing surface of the roller 37 centrally of the height of the track and providing two spaced bearing surfaces 42 and 43 on the roller 38 which respectively engage the upper and lower portions of the outer track surface above and below the central portion engaged by the roller 37 (see Fig. 2).

In order to firmly support the carriage C on the track T with the axis of the diamond point 18 normal to the inner track bearing surface 26 as the carriage moves successively along the straight track portion 20, the curved portion 19 and the straight portion 21, means are provided in the form of arcuate extensions on the outer surface of the track at each side of the arcuate portion 19 thereof for engaging the trailing or rearward roller of the carriage and carrying it in an arcuate path at the point in the carriage travel when the inner roller 36 and the leading outer roller similarly move from straight to arcuate paths. As best shown in Fig. 1, the track T is of greater width along its arcuate portion 19 than along its straight portions 20 and 21, so that all of the carriage rollers 36, 37 and 38 are in tight contact with the track faces when the carriage is on the arcuate portion 19, as illustrated in broken lines in Fig. 1. The inner track surface of the curved portion 19 is tangent to the contiguous straight portions 20 and 21 as shown, but the outer arcuate track surface is not tangent to the adjacent straight outer surfaces of the portions 20 and 21 which join the curved surface at the points 44 and 55.

A central arcuate extension 45 of the outer arcuate track surface extends beyond the point 44 along a continuation of the curve of the outer track surface and meets the straight outer surface of the track portion 20 at the point 46. This arcuate extension 45 is in line with the carriage roller 37 and is spaced laterally of the outer track surface from the bearing surfaces 42 and 43 of the carriage roller 38. The arrangement is such that the outer track surface has an arcuate portion parallel to its inner surface along the curved track portion 19 and a straight portion parallel to the inner surface of the straight track 20, and also has an intermediate portion composed of a pair of laterally spaced straight parts 53 and 54 which are overlapped by the arcuate extension 45 lying therebetween. The length of the arcuate extension 45, that is, the distance between the points 44 and 46, is equal to the distance between the outer carriage rollers 38 and 37, so that at the point in the travel of the carriage from the straight track portion 20 to the arcuate track portion 19 when the bearing faces 42 and 43 of the leading outer roller 38 move from a straight surface to an arcuate surface, which is also the point at which the inner roller 36 moves from a straight to an arcuate surface, the trailing outer roller 37 moves onto the arcuate extension 45. This arrangement causes all three of the carriage rollers 36, 37 and 38 to simultaneously change from straight to arcuate paths of movement with the result that the axis of the dressing tool 18 is maintained normal to the inner bearing surface 26 of the track T at all points in the travel of the carriage.

When the leading outer roller 38 moves past the point 44 from the straight to the curved outer track surface, it leaves the track momentarily, and I prefer to provide spring pressed plungers at this point. Two such plungers 47 and 48 are shown slidably disposed in recesses in the track T with their outer ends at the points of juncture between the outer surface of the arcuate track portion 19 and the contiguous straight outer surface portions 53 and 54 above and below the arcuate extension 45 (see Figs. 1 and 2). The plungers 47 and 48 are biased outwardly by suitable coiled springs 49 and 50. Outward movement of the plungers beyond the positions shown is limited by a transverse pin 51 extending into recesses 52 in the cylindrical surfaces of the plungers 47 and 48. The outer ends of the plungers 47 and 48 are preferably tapered to a line disposed substantially at the juncture between the straight and arcuate portions of the outer track surface, as shown.

The outer surface of the track T is similarly constructed at the region of transition from the arcuate portion 19 to the other straight portion 21. Thus at the point 55, the central part of the outer track surface, in line with the roller 37, changes from an arcuate to a straight path, and a spring pressed plunger 56, similar to the above described plungers 47 and 48, is disposed at this point. Two arcuate extensions 57 and 58 of the outer curved track surface are provided above and below the central straight section 59 and are so disposed laterally of the outer track surface as to be engaged by the bearing surfaces 42 and 43 of the carriage roller 38 while the roller 37 engages the arcuate portion 19. The arcuate extensions 57 and 58 meet the straight outer surface of the track portion 21 at the point 60 and the distance between the points 55 and 60 over which the arcuate extensions 57 and 58 and the straight section 59 overlap, is equal to the distance between the carriage rollers 37 and 38. As the carriage C moves from the arcuate portion 19 to the straight portion 21, its three rollers 36, 37 and 38 simultaneously change from arcuate to straight paths. Thus the roller 38 passes the point 60 just as the roller 37 passes the point 55, and at the same time the inner roller 36 passes the point of tangency 61 between the arcuate and straight portions of the inner track surface 26.

With the arrangement described, the carriage C is firmly disposed with its inner roller 36 in continuous engagement with the inner track surface at all points in the movement of the carriage along the track, and is so disposed that the diamond point 18 may be maintained normal to the inner track surface throughout the movement of the carriage. Thus the diamond point 18 may be accurately moved along the profile to be dressed and may be maintained normal to such profile at all points.

A practical embodiment of the above described device is illustrated in Figs. 6 to 9 inclusive. As there shown, the track T' is disposed on and fixed to a boss 62 on the bottom wall of an angular housing H which may be adjustably supported on a grinding machine or similar machine tool by suitable means such as a guide 63 and a clamp 64. As in the above described diagrammatic illustration, the track T' has an arcuate portion 65 and two contiguous straight portions 66 and 67, and the inner surface of the track has a bearing portion 17 accurately finished to correspond to the particular profile to be dressed, which profile is represented as that of the rotary grinding wheel 68 which includes two straight portions 69 and 70 tangent to an arcuate portion 71.

The carriage C' mounted on the track T' has an inner roller 72 engaging the bearing portion 17 of the inner track surface and two outer rollers 73 and 74, equally spaced from the inner roller 72 and engaging the outer track surface. The outer roller 74 has two spaced bearing surfaces 75 and 76 arranged to engage the upper and lower portions of the outer track surface, and the surface of the roller 73 is centrally disposed to engage the central part of the outer track surface between the parts engaged by the bearing surfaces 75 and 76 of the roller 74.

At the juncture between the straight track portion 66 and the arcuate portion 65, a central arcuate extension 77 is provided on the outer track surface, and comprises in profile a continuation of the arc forming the outer surface of the arcuate track portion 65. The length of the arcuate extension 77 from the point 78 to the point 79 is equal to the distance between the axes of the outer carriage rollers 74 and 73. The arcuate extension 77 is engaged only by the roller 73, the bearing surfaces 75 and 76 of the roller 74 engaging the adjacent upper and lower flat outer track surfaces 80 and 81. Similarly, a pair of laterally spaced arcuate extensions 82 and 83 are disposed on the outer track surface where the arcuate track portion 65 joins the other straight track portion 67, these extensions being aligned with the bearing surfaces 75 and 76 of the roller 74 and having a flat surface 84 therebetween. Spring pressed plungers 85 and 86 are disposed at the point 78 where the flat outer track sections 80 and 81 meet the arcuate outer surface of the arcuate track portion 65, and a similar spring pressed plunger 87 is disposed at the point 88 where the flat outer track surface section 84 meets the arcuate surface at the other end of the curved track section 65. The plungers 85, 86 and 87 are of the same construction and mounting as the plungers 47, 48 and 49 described above in connection with the embodiment of Figs. 1 to 5 inclusive.

The carriage C' has an upper plate 89 and lower plates 90 and 91 connected thereto, the lower plates extending under overhanging portions of the track T' as shown in Fig. 8. The rollers 72, 73 and 74 are journaled on suitable shafts 92, 93 and 94 respectively, and these shafts are suitably secured in openings in the plates 89, 90 and 91. The bearing 95 of the roller 73 is eccentric with respect to the axis of its shaft 93 so that by turning the shaft to various angular positions the position of the roller 73 may be adjustably varied to compensate for wear of the several rollers on their journals. As shown, a flat face 96 is provided on an enlarged head 15 of the shaft 93, and two adjusting set screws 97 and 98 carried in an extension of the plate 89 bear on the face 96 on opposite sides of the center of the shaft 93. It will be clear that relative adjustment of the set screws 97 and 98 turns the shaft 93 and so moves the roller 73 toward or away from the other two carriage rollers 72 and 74.

The diamond point 99 is secured in an opening at the inner apex of the carriage C' by a set screw 100, and a tapered ended adjustment screw 101 is provided to adjust the diamond point toward the work. The diamond point is preferably so mounted that its axis is substantially normal to the inner surface of the track T, and so is normal to the surface being dressed at all points along that surface.

As shown in Fig. 8, the housing H has an elongated opening 102 along its inner wall through which the apex of the carriage C', carrying the diamond point 99, protrudes. Suitable means in the form of a nut 103 carried by a screw shaft 104 is provided for continuously propelling the carriage C' along the track T' without interruption. The screw shaft 104 is journaled in suitable bearings in the housing H as shown in Figs. 6 and 7, and may be driven through a gear train 105 by a handle 106. The nut 103 is connected to the carriage C' by a link 107 pivotally secured to both the nut and the upper plate 89 of the carriage. The housing H is preferably closed by a cover 108.

The operation of the embodiment disclosed in Figs. 6 to 9 inclusive is the same as that explained above in connection with Figs. 1 to 5.

As previously explained, the invention is applicable to operations in which the work or part being finished is moved in a composite straight and arcuate path relative to a finishing tool, and such an application is illustrated in Figs. 10 to 14 inclusive. The device there shown is adapted to finish the inner bore of a part such as a nozzle 110, this bore comprising a surface of rotation including a straight profiled section 111 and a contiguous arcuate profiled section 112 to which the straight section 111 is tangent, as best shown in Fig. 14.

The disclosed apparatus includes a carriage C'' mounted on a track T'', the track being supported by a boss 113 on a base member 114. As shown in Fig. 13, the track T'' has a straight portion 115 and an arcuate curved portion 116, and the inner surface of the straight track portion is tangent to the inner surface of its arcuate portion. Only one straight track portion is employed, since the part profile to be finished has but one straight portion tangent to an arcuate portion. Obviously, the shape of the track may be varied to suit the profile being dressed.

The carriage C″ comprises an upper plate 117 engaging the flat upper surface of the track T″ and a lower plate 118 connected to the upper plate by a post 119 and underlying the overhanging outer surface of the track, as shown in Fig. 12. The three carriage rollers 120, 121 and 122 are, as in the previous embodiments, arranged in the form of an isosceles triangle, with the roller 120 engaging the inner track surface and the two outer rollers 121 and 122 engaging spaced points on the outer track surface. The roller 122 has two bearing surfaces 123 and 124 spaced apart laterally of the outer track surface and the roller 121 has a single bearing surface disposed centrally of the outer track surface out of line with the bearing surfaces 123 and 124. In the disclosed embodiment, the inner carriage roller 120 is of the same curvature as the inner surface of the arcuate portion 116 of the track T″. This arrangement is possible because the carriage approaches the arcuate track section from one side only and does not thereafter move beyond the arcuate section. The roller 120 is journaled on a stub shaft 125 fixed to the upper carriage plate 117, and the rollers 121 and 122 are journaled on shafts 126 and 127 carried by the plates 117 and 118.

An arcuate extension 128 is provided on the outer surface of the track T″ where the straight track portion 115 joins the arcuate portion 116. The arcuate extension 128 is a continuation of the arcuately curved outer surface of the curved track portion 116, and it joins the straight outer surface of the track portion 116 at the point 129. The spaced straight outer track surface portions 130 and 131 that overlap and lie laterally adjacent the extension 128 meet the arcuate outer track surface of the curved track portion 116 at the point 132. The distance between the points 129 and 132 is such that the rollers 121 and 122 simultaneously engage the opposite ends of the arcuate extension 128, as shown in Fig. 11. A pair of spring pressed plungers 133 is provided at the point 132, each plunger of this pair being disposed at the juncture between one of the flat outer track surface sections 130 and 131 and the arcuate outer surface of the curved track portion 116. The plungers 133 may be of the same construction and mounting, and serve the same purpose as the plungers 47 and 48 described in connection with the embodiment of Figs. 1 to 5 inclusive.

A rotary chuck 134 or other suitable part for supporting the nozzle or other work 110 is carried on the carriage C″. The head 135 in which the spindle 136 of the chuck 134 is journaled is adjustably secured to the upper carriage plate 117 through two transversely disposed slides 137 and 138, whereby adjustment of the chuck 134 relative to the carriage C″ is permitted. The spindle 136 and chuck 134 may be rotatably driven by any suitable means such as a motor 139 mounted on the head 135 and connected by a belt 140 and a cross shaft 141 to the spindle 136.

The finishing tool shown comprises a small grinding wheel 142 carried by a shaft 143 journaled in a head 144. The shaft 143 may be rotated by a motor 145 suitably connected thereto and mounted on a bracket of the head 144, as shown in Fig. 10. The head 144 may be adjustably mounted on transversely disposed slides 146 and 147. One of the slides 146 is preferably provided with a screw feed as shown and is arranged to move the grinding wheel 142 laterally parallel to its axis of rotation to provide the requisite feed during the finishing operation. In accordance with the usual practice, the grinding wheel 142 may be oscillated axially while it rotates to distribute the wear on its grinding surface, if desired.

In the operation of the embodiment of Figs. 10 to 14 inclusive, the inner bore of the nozzle 110 is ground to the desired profile by first moving the carriage C″ along the straight portion 115 of the track T″, whereby the grinding wheel 142 traverses the straight portion 111 of the nozzle profile, and then turning the carriage C″ around the curved portion 116 of the track T″, whereby the grinding wheel 142 dresses the arcuate portion 112 of the nozzle bore profile. These operations are illustrated in Fig. 14, wherein the center about which the carriage turns the nozzle 110 as the carriage traverses the arcuate portion 116 of the track T″, is indicated at 148.

Although the invention has been disclosed in connection with certain specific embodiments, it will be understood that various modifications and changes from the disclosed embodiments may be made within the scope of the appended claims. For example, the shape of the carriage bearing track may be altered as desired to conform to that of the profile being finished, which may include straight portions disposed at various angles to each other and one or more arcuate portions of any desired radius of curvature.

I claim:

1. In a device of the character described, in combination with two elements comprising a finishing tool and a support for a part to be finished, means for causing relative movement between said elements in a prescribed path comprising a track having an inner surface with an arcuate portion and a straight portion tangent thereto and an oppositely disposed outer surface with arcuate and straight portions respectively parallel to said inner surface arcuate and straight portions, a carriage mounted on said track and having three rollers carried on axes that are fixed against movement relative to each other, said rollers comprising a single roller engaging said inner track surface and two rollers equally spaced from said single roller and engaging longitudinally spaced points on said outer track surface, said outer rollers being displaced transversely of said outer track surface to engage different areas thereof, an arcuate extension of said outer track surface arcuate portion aligned with one of said outer rollers, a straight extension of said outer track surface straight portion overlapping and co-extensive with said arcuate extension and aligned with the other of said outer rollers, and means for mounting one of said elements on said carriage.

2. In a device of the character described, in combination with two elements comprising a finishing tool and a support for a part to be finished, means for causing relative movement between said elements in a prescribed path comprising a track having an inner surface with an arcuate portion and a straight portion tangent thereto and an oppositely disposed outer surface with arcuate and straight portions respectively parallel to said inner surface arcuate and straight portions, a carriage mounted on said track and having three rollers carried on axes that are fixed against movement relative to each other, said rollers comprising a single roller engaging said inner track surface and two rollers equally spaced from said single roller and engaging longitudinally spaced points on said outer track surface, said outer rollers being displaced transversely of said outer track surface to engage different areas thereof, an arcuate extension of said outer track surface arcuate portion aligned with the one of said outer rollers that last engages said arcuate track surface portion when said carriage moves toward said arcuate portion, a straight extension of said outer track surface straight portion overlapping and coextensive with said arcuate extension and aligned with the other of said outer rollers, and means for mounting one of said elements on said carriage.

3. In a device of the character described, a track having an arcuate portion and at least one straight portion tangent thereto, said track having oppositely disposed inner and outer surfaces, a carriage mounted for travel along said track, three rollers carried by said carriage on axes that are fixed against movement relative to each other, said rollers comprising a single roller on said carriage engaging the inner surface of said track and a pair of outer rollers on said carriage equally spaced from said single roller and engaging points spaced longitudinally of the outer surface of said track, a dressing tool having a dressing point, means for mounting said dressing tool on said carriage with the axis of its point substantially normal to the inner surface of said track, and means on the outer surface of said track for respectively engaging the two outer rollers of said carriage and simultaneously changing the path of movement of both said rollers from straight line movement to arcuate movement as said carriage moves from said straight track portion to said arcuate track portion.

4. In a device of the character described, a track having an arcuate portion and two straight portions tangent to said arcuate portion at its opposite ends, said track having oppositely disposed inner and outer surfaces, a carriage mounted for travel along said track, three rollers carried by said carriage on axes that are fixed against movement relative to each other, said rollers comprising a single roller on said carriage engaging the inner surface of said track and a pair of outer rollers on said carriage equally spaced from said single roller and engaging points spaced longitudinally of the outer surface of said track, and means on the outer surface of said track adjacent the junctures of said straight track portions with said arcuate track portion for respectively engaging the two outer rollers of said carriage and simultaneously changing the path of movement of both of said outer rollers from a straight line to an arc as said carriage moves from either of said straight track portions onto said arcuate track portion.

5. In a device of the character described, a track having an arcuate portion and two straight portions tangent to said arcuate portion at its opposite ends, said track having oppositely disposed inner and outer surfaces, a carriage mounted for travel along said track, three rollers carried by said carriage on axes that are fixed against movement relative to each other, said rollers comprising a single roller on said carriage engaging the inner surface of said track and a pair of outer rollers on said carriage equally spaced from said single roller and engaging points spaced longitudinally of the outer surface of said track, said respective outer rollers having outer track surface engaging portions that are relatively spaced transversely of said outer track surface, an arcuate extension on the outer surface of said track adjacent the juncture of one of said straight track portions and said arcuate track portion and aligned with the track surface engaging portion of one of said outer rollers, and an arcuate extension on the outer surface of said track adjacent the juncture of the other of said straight track portions and said arcuate track portion and aligned with the track surface engaging portion of the other of said outer rollers.

6. In a device of the character described, in combination with two elements comprising a finishing tool and a support for a part to be finished thereby, means for causing relative movement between said elements along a prescribed path comprising a track having oppositely disposed inner and outer surfaces, said inner surface including an arcuate portion and a straight portion tangent thereto and said outer surface including an arcuate portion parallel to said inner surface arcuate portion, a straight portion parallel to said inner surface straight portion and an intermediate portion including an arcuate part forming a continuation of said parallel arcuate portion and a straight part forming a continuation of said parallel straight portion and overlapping and spaced laterally from said continuation arcuate portion, a carriage movable on said track, a single means on said carriage engaging said inner track surface at one point and a pair of means on said carriage engaging points spaced longitudinally of said outer track surface, said three track engaging means being fixed against movement relative to each other, one of said outer track surface engaging means being aligned with said straight part of said intermediate outer track surface portion and the other of said outer track surface engaging means being aligned with said arcuate part of said intermediate outer track surface portion and means for securing one of said elements to said carriage.

7. In a device of the character described, in combination with two elements comprising a finishing tool and a support for a part to be finished thereby, means for causing relative movement between said elements along a prescribed path comprising a track having oppositely disposed inner and outer surfaces, said inner surface including an arcuate portion and a straight portion tangent thereto and said outer surface including an arcuate portion parallel to said inner surface arcuate portion, a straight portion parallel to said inner surface straight portion and an intermediate portion including an arcuate part forming a continuation of said parallel arcuate portion and a straight part forming a continuation of said parallel straight portion and overlapping and spaced laterally from said continuation arcuate portion, a carriage mounted on said track, three rollers carried by said carriage on axes that are fixed against movement relative to each other, said rollers comprising a single roller on said carriage engaging said inner track surface and a pair of rollers on said carriage engaging points spaced longitudinally of said outer track surface and spaced equally from said inner track surface engaging roller, the one of said outer track surface engaging rollers that first engages said arcuate track surface portion being aligned with said straight part of said intermediate outer track surface portion and the other of said outer track surface engaging rollers being aligned with said arcuate path of said intermediate outer track surface portion, and means for securing one of said elements to said carriage.

8. In a device of the character described, in combination with two elements comprising a finishing tool and a support for a part to be finished thereby, means for causing relative movement between said elements along a prescribed path comprising a track having oppositely disposed inner and outer surfaces, said inner surface including an arcuate portion and a straight portion tangent thereto and said outer surface including an arcuate portion parallel to said inner surface arcuate portion, a straight portion parallel to said inner surface straight portion and an intermediate portion including an arcuate part forming a continuation of said parallel arcuate portion and a straight part forming a continuation of said parallel straight portion and overlapping and spaced laterally from said continuation arcuate portion, a carriage mounted on said track, three rollers carried by said carriage on axes that are fixed against movement relative to each other, said rollers comprising a single roller on said carriage engaging said inner track surface and a pair of rollers on said carriage engaging points spaced longitudinally of said outer track surface by a distance equal to the length of said intermediate outer track surface portion, said outer rollers being spaced equally from said inner roller, the one of said outer track surface engaging rollers that first engages said parallel arcuate track surface portion being aligned with said straight part of said intermediate outer track surface portion and the other of said outer track surface engaging rollers being aligned with said arcuate part of said intermediate outer track surface portion and means for securing one of said elements to said carriage.

9. In a device of the character described, in combination with two elements comprising a finishing tool and a support for a part to be finished, means for causing relative movement between said elements in a prescribed path comprising a track having an inner surface with an arcuate portion and a straight portion tangent thereto and an oppositely disposed outer surface with arcuate and straight portions respectively parallel to said inner surface arcuate and straight portions, a carriage mounted on said track and having a single roller engaging said inner track surface and two rollers equally spaced from said single roller and engaging longitudinally spaced points on said outer track surface, said outer rollers being displaced transversely of said outer track surface to engage different areas thereof, an arcuate extension of said outer track surface arcuate portion aligned with one of said outer rollers, a straight extension of said outer track surface straight portion overlapping and co-extensive with said arcuate extension and aligned with the other of said outer rollers, resiliently mounted means extending from said outer track surface at the juncture of said straight extension and said arcuate portion for yieldably engaging one of said outer carriage rollers as it moves past said juncture, and means for mounting one of said elements on said carriage.

10. In a device of the character described, in combination with two elements comprising a finishing tool and a support for a part to be finished, means for causing relative movement between said elements in a prescribed path comprising a track having an inner surface with an arcuate portion and a straight portion tangent thereto and an oppositely disposed outer surface with arcuate and straight portions respectively parallel to said inner surface arcuate and straight portions, a carriage mounted on said track and having a single roller engaging said inner track surface and two rollers equally spaced from said single roller and engaging longitudinally spaced points on said outer track surface, said outer rollers being displaced transversely of said outer track surface to engage different areas thereof, an arcuate extension of said outer track surface arcuate portion aligned with the one of said outer rollers that last engages said arcuate outer track surface portion when said carriage moves toward such arcuate portion, a straight extension of said outer track surface straight portion overlapping and co-extensive with said arcuate extension and aligned with the other of said outer rollers, a yieldably mounted plunger extending from said outer track surface at the juncture of said straight extension and said arcuate portion for yieldably engaging said other of said outer carriage rollers as it moves past said juncture, and means for mounting one of said elements on said carriage.

ARDEN LEE JOHNSON.

REFERENCES CITED

The following references are of record in the file of this patent:

UNITED STATES PATENTS

| Number | Name | Date |
|---|---|---|
| 2,026,109 | Walters | Dec. 31, 1935 |
| 2,304,970 | Turner | Dec. 15, 1942 |
| 2,369,405 | Pollard et al. | Feb. 13, 1945 |